United States Patent Office 3,270,071
Patented August 30, 1966

3,270,071
PRODUCTION OF OLIGOMERS OF
BUTADIENE-(1,3)
Herbert Mueller, Frankenthal, Pfalz, Emil Scharf, Ludwigshafen (Rhine), and Dietmar Wittenberg, Mannheim, Germany, assignors to Badische Anilin- & Soda-Fabrik Aktiengesellschaft, Ludwigshafen (Rhine), Germany
No Drawing. Filed Dec. 20, 1963, Ser. No. 332,261
Claims priority, application Germany, Dec. 22, 1962, B 70,118
7 Claims. (Cl. 260—666)

This invention relates to a new process for the production of oligomers of butadiene-(1,3) (hereinafter termed butadiene).

Oligomers of 1,3-dienes have in recent times achieved increasing importance as intermediates for plastics and as initial materials for other chemical reactions. Catalysts which contain titanium, chromium, iron, cobalt or nickel have become known for the oligomerization of 1,3-dienes.

In some of the known methods using nickel catalysts, the initial materials for the production of the catalysts are nickel (II) compounds which are reduced in the presence of an electron donor. Metal hydrides or organometallic compounds are used as reducing agents according to Belgian patent specification No. 598,363. The use of certain metals as reducing agents is described in U.S. patent application Serial No. 137,964, filed September 14, 1961, by Herbert Mueller. These methods give good yields of oligomers, particularly cyclic dimers, but they have the disadvantage that either it is necessary to use substances which are difficult to handle and which are sensitive to oxygen and moisture or, if the reduction takes place in a heterogeneous system, it is necessary to mix the catalyst components intensely for a long period.

In the said methods, the nickel (II) compounds are converted into catalytically active nickel (0) compounds. Attempts have also been made to avoid the said reduction and to start direct from nickel (0) compounds in the production of the catalysts. Catalysts which have been obtained by reaction of an organic nickel (0) compound free from carbon monoxide, such as nickel (0)-bisacrylonitrile or nickel (0)-bisacrolein, with an ester of phosphorous acid are used in the process according to U.S. patent application Serial No. 121,362, filed July 3, 1961, by Nikolaus von Kutepow, Hubertus Seibt and Fritz Meier. According to another proposal, catalysts are used which have been formed from the said components in the presence of butadiene. The organic nickel (0) compounds free from carbon monoxide are obtained from nickel tetracarbonyl and α,β-unsaturated nitriles or aldehydes, such as acrylonitrile or acrolein.

In older methods for the oligomerization of 1,3-dienes, nickel carbonyl catalysts have been used in which one or two of the carbonyl ligands is replaced by a compound of trivalent nitrogen or phosphorus. Such compounds readily form from nickel tetracarbonyl and the said compounds which displace one or two carbon monoxide ligands (cf. German patent specifications No. 881,511 and No. 951,213). The yields are however unsatisfactory. According to the examples of the said specification, they amount at best to 44%. While the yields may be improved by the choice of particularly favorable reaction conditions (cf. U.S.A. patent specification No. 3,004,- 081), by adding isobutylene or diisobutylene (cf. U.S.A. patent specification No. 2,972,640) or cycloaliphatic dienes (cf. U.S.A. patent specification No. 2,964,575), the reaction speeds are relatively small so that good space-time yields cannot be achieved.

A better space-time yield is obtained by the process according to Belgian patent specification No. 607,397 in which a nickel catalyst containing carbonyl is used in which three arsenite or phosphite radicals are present. Such complex compounds are not so readily accessible, however, because replacement of the third carbon monoxide ligand by an arsenite or phosphite does not take place so easily as the displacement of the first two ligands.

According to French patent specification No. 1,290,- 659 a catalyst is used which consists of nickel tetracarbonyl and a hydride or an organometallic compound. These catalysts are however not particularly effective because 1-vinylcyclohexene-(3) (the reaction product of the thermal Diels-Alder dimerization) forms in yields of 24 to 83% as a byproduct of the catalytic oligomerization.

It is an object of the present invention to provide a process by which butadiene can be oligomerized in the presence of a catalyst consisting of nickel carbonyl. It is another object of the invention to provide a process in which a catalyst is used consisting of nickel carbonyl without the coemployment of a compound of nitrogen, phosphorus, arsenic or antimony and giving good yields and high reaction speeds, i.e., good space-time yields.

These objects are achieved in accordance with this invention by bringing butadiene into contact with a catalyst which is formed from nickel carbonyl and a polyene or an acetylene compound, if the concentration of carbon monoxide is kept low during the action of the said components on each other.

Good yields of butadiene oligomers are obtained by the process according to this invention, particularly in continuous operation. The most readily accessible of all nickel compounds, namely nickel tetracarbonyl, is used direct for the production of the catalyst. Although the catalyst is used only in a small amount, a high reaction speed and consequently high space-time yields are achieved. It is surprising that nickel carbonyl should yield an effective oligomerization catalyst by the action of a polyene or an acetylene compound if the concentration of carbon monoxide is kept low. According to H. W. B. Reed, J. Chem. Soc. (1954), page 1934 (paragraph 4), an effective oligomerization catalyst is not formed from nickel carbonyl and the 1,3-diene to be reacted.

Mainly dimers and trimers of butadiene are obtained by the process according to this invention. The butadiene need not be pure but may also be used mixed with other substances which are inert under the conditions of the process.

The nickel carbonyl used for the production of the catalyst may be pure or of commercial quality. Only a small amount of nickel carbonyl need be used, for example between 5 and 0.0005% by weight with reference to the 1,3-diene to be reacted. It is preferred to use a catalyst concentration between 0.5 and 0.001% by weight.

An acetylene compound or a polyene is allowed to act on nickel carbonyl for the production of the catalyst. Preferred acetylene compounds contain two to twenty carbon atoms and have hydrocarbon structure. Acetylene compounds containing two to twenty carbon atoms and which bear inert groups or atoms are also suitable. Examples of such groups or atoms are carboxylic ester groups, such as carboalkoxy groups having one to four carbon atoms, and acyloxy groups, for example those derived from fatty acids having one to four carbon atoms. Examples of suitable acetylene compounds are acetylene, methylacetylene, butine-(2), octadecine-(1), vinylacetylene, methyl propiolate, phenylacetylene, diphenylacetylene, propargyl acetate. Preferred polyenes have two to four olefinic double bonds, four to sixteen carbon atoms and hydrocarbon structure. The polyenes may also contain the said inert atoms or groups. Examples of suitable polyenes are: cyclooctadiene-(1,5), cyclododecatriene-(1,5,9), isoprene, piperylene, cyclohexadiene-(1,3) and phenylbutadiene. It is particularly advantageous to use butadiene. In this way no extraneous component is introduced into the reaction mixture. An appreciable effect is achieved in the production of the catalyst by the use of only a small amount of acetylene compound or polyene, for example with 1 mole per mole of nickel carbonyl. It is recommendable, however, to use a considerable excess of the unsaturated compound, for example 4 to 400 moles per mole of nickel tetracarbonyl. Coemployment of an inert solvent in the production of the catalyst is recommended particularly when the unsaturated compound is used in only relatively small amounts. Examples of suitable inert solvents are aliphatic, cycloaliphatic and aromatic hydrocarbons and ethers, such as hexane, heptane, cyclohexane, benzene, cyclooctane, hydrocarbon mixtures boiling between about 60° and 200° C., obtained from petroleums, tetrahydrofurane, dioxane and diisopropyl ether.

The catalyst forms from nickel tetracarbonyl and the said unsaturated compounds at temperatures which are advantageously between 0° and 200° C., particularly between 40° and 150° C. The pressure depends in general on the vapor pressure of the nickel tetracarbonyl and of the unsaturated compound at the temperature concerned. It is therefore usual to use atmospheric pressure or superatmospheric pressure, for example up to 25 atmospheres. The interaction of the said components and the oligomerization may be clearly separate. It is also possible however to allow the two stages to merge by adding nickel carbonyl to the butadiene to be reacted which is then oligomerized when the catalyst has formed. In any case it is an essential feature of the process according to this invention that the concentration of carbon monoxide is kept low during the interaction of the catalyst components. It is advantageous to remove carbon monoxide continuously or periodically from the interaction mixture. It has been observed that carbon monoxide is at least partially displaced from the nickel carbonyl by the unsaturated compound. This process is apparently promoted by removal of the carbon monoxide. It is not only by removal of carbon monoxide from the interaction mixture however that the concentration of carbon monoxide may be kept low. Another method of achieving the same result is by using the nickel carbonyl in a low concentration, preferably from 0.001 to 0.1% by weight with reference to the butadiene to be reacted. When working continuously, the amount of monomers reacted per unit of time is surprisingly substantially independent of the catalyst concentration. This means that the activity of the catalyst increases strongly with increasing dilution. By diluting the nickel carbonyl, the concentration of carbon monoxide is decreased at the same time because the amount of carbon monoxide to be expected theoretically is proportional to the amount of nickel carbonyl.

It is particularly advantageous to combine the said two possibilities of keeping the carbon monoxide concentration low, namely by using the nickel carbonyl in a low concentration and also providing means for removing carbon monoxide from the reaction mixture.

The procedure for the preparation of the catalyst may be for example that nickel carbonyl, a polyene or an acetylene compound and if desired a solvent are heated to the reaction temperature in an autoclave, the pressure on the mixture being released from time to time. It is also possible to pass an inert gas through the reaction mixture, for example nitrogen or argon, and if necessary to separate and return any entrained liquid components of the reaction mixture from the gas stream. The catalyst mixture which is formed in this way is then used in the conventional way for the oligomerization. Temperatures are used which are advantageously between 50° and 150° C. At lower temperatures the rate of reaction is too slow, while at higher temperatures byproducts occur in increasing quantities. It is possible to work at atmospheric pressure or to use superatmospheric pressures, for example the pressure resulting from the vapor pressures of the reactants at the temperature in question.

It is particularly advantageous to combine the production of the catalyst with the actual oligomerization by supplying nickel carbonyl to the reaction mixture and producing the catalyst from the nickel carbonyl and the butadiene.. For example nickel carbonyl and butadiene are introduced continuously into an autoclave having stirring means, the reaction mixtures being if desired decompressed periodically or off-gas being removed continuously. Butadiene and other readily condensable components are separated from the escaping gas by cooling, the carbon monoxide escaping as such.

In one embodiment of the continuous process, the reaction is carried out in a cascade of reactors provided with stirring means. Only a portion, for example up to 50% by weight of the total amount, of the butadiene is supplied to the first reactor and the reaction is completed by the supply of the remaining initial material to the subsequent reactors. Carbon monoxide is advantageously removed in the way described from the first reactor and if desired also from one or more of the following reactors. It is often advantageous, in order that the last traces of the initial material should be reacted, not to supply any butadiene to the last reactor. Working up, as in all other embodiments of the process, is advantageously carried out by distillation.

The invention will be further illustrated by the following examples. The parts specified in the examples are parts by weight, unless otherwise stated. They bear the same relation to parts by weight as the g. to the ccm. (S.T.P.).

*Example 1*

500 parts of butadiene, 50 parts by volume of benzene and 0.25 part of nickel tetracarbonyl are heated to 100° C. in an autoclave while excluding oxygen and moisture. 10,000 parts by volume of off-gas is removed per hour from the autoclave and the 1,3-diene thus removed is replaced by an equivalent amount of fresh butadiene. Withdrawal of off-gas and supply of butadiene are stopped after eight hours. The mixture is kept at the same temperature for another eight hours and then it is worked up by fractional distillation.

81% of the butadiene used has been reacted. Cyclooctadiene-(1,5) having a boiling point of 150° to 151° C. at 760 mm. Hg is obtained in a yield of 23% and cyclododecatriene-(1,5,9) in a yield of 69%, with reference to reacted butadiene.

EXAMPLE 2

0.019 part of nickel tetracarbonyl dissolved in 2 parts of cyclooctadiene-(1,5) is introduced per hour at 100° C. into a vessel having a capacity of 235 parts by volume and fitted with a stirrer. At the same time, liquid butadiene is pumped in at the rate at which it is used up so that a pressure of 2.4 atmospheres gauge is maintained. The average rate of supply of the butadiene is 18.3 parts per hour. At the same time 2.3% of the butadiene supplied is continuously withdrawn as gas in order to remove inert gas and carbon monoxide. The reaction mixture is continuously discharged over an overflow. In an attached residence chamber, the butadiene dissolved in the reaction mixture (the amount being determined by the saturation pressure at the reaction temperature) is allowed to react further.

In the course of six hours, 122 parts of discharge containing 0.7% by weight of unreacted butadiene is thus obtained. Analysis of the discharge shows that the following butadiene oligomers have ben formed: 7.8% of 1-vinylcyclohexene-(3), 38% of cyclooctadiene-(1,5), 46.1% cyclododecatriene-(1,5,9), 5.1% of a mixture of $C_{16}$-hydrocarbons and 2.2% of high oligomers which remain as a distillation residue. The above yields are with reference to reacted butadiene.

By working under the same conditions but supplying per hour only 0.010 part of nickel tetracarbonyl dissolved in 2 parts of cyclooctadiene-(1,5), 119 parts of reaction mixture is obtained in six hours. 8% of 1-vinylcyclohexene-(3), 34% of cyclooctadiene-(1,5), 50% of cyclododecatriene-(1,5,9), 4.8% of $C_{16}$-hydrocarbons and 2% of residue are obtained, all with reference to reacted butadiene.

By supplying 5 parts of nickel carbonyl per hour under otherwise the same conditions, vinylcyclohexene is obtained almost exclusively as the reaction product in accordance with the findings of Reed (above).

EXAMPLE 3

A catalyst solution is prepared by heating (a) nickel carbonyl and (b) a polyene or an acetylene compound in the ratio 1:150, if desired with an inert solvent, for five hours at 120° C. and passing a weak current of nitrogen through the mixture during this period. The catalyst solution obtained is used in the way described in Example 2, i.e. 2 parts of the catalyst solution is supplied to the reactor per hour.

The polyenes or acetylene compounds used and also the yields of cyclooctadiene-(1,5) and cyclododecatriene-(1,5,9) with reference to reacted butadiene are given in the following table:

Table

| Polyene or acetylene compound | Yield of cyclooctadiene-(1,5), percent | Yield of cyclododecatriene-(1,5,9), percent |
|---|---|---|
| Cyclooctadiene-(1,5) | 39 | 47 |
| Cyclododecatriene-(1,5,9) | 33 | 52 |
| Phenylacetylene:ethylbenzene [1] | 36 | 50 |
| Octadecine-(1):cyclohexane [2] | 36 | 49 |
| Propargyl acetate:xylene [3] | 27 | 48 |
| Isoprene | 38 | 45 |
| Piperylene | 35 | 45 |
| Ethyl sorbate | 21 | 42 |

[1] Ratio by weight 1:9.
[2] Ratio by weight 1:12.
[3] Ratio by weight 1:20.

We claim:

1. A process for the oligomerization of butadiene which comprises preparing an oligomerization catalyst by the interaction of nickel tetracarbonyl with a compound selected from the group consisting of polyenes and acetylene compounds, said interaction releasing carbon monoxide from said nickel tetracarbonyl, keeping the displaced carbon monoxide content of the catalyst interaction mixture low by removing said carbon monoxide from the catalyst interaction mixture, and oligomerizing butadiene in the presence of said catalyst of low carbon monoxide content at a concentration of said catalyst at 0.001% to 5% with reference to the butadiene.

2. A process as claimed in claim 1 wherein the carbon monoxide is removed from the catalyst interaction mixture by conducting said interaction under pressure and releasing said pressure from time to time to remove the carbon monoxide from the catalyst interaction mixture.

3. A process as claimed in claim 1 wherein said interaction is conducted in a liquid phase, and an inert gas is passed therethrough to remove the carbon monoxide from the catalyst interaction mixture.

4. A process as claimed in claim 1 wherein said compound is butadiene, and said carbon monoxide is removed from the catalyst interaction mixture by withdrawing therefrom butadiene and carbon monoxide as an off gas.

5. A process for the oligomerization of butadiene which comprises contacting butadiene with nickel carbonyl at a ratio of only 0.001 to 0.1% by weight of nickel carbonyl with reference to said butadiene to first form the oligomerization catalyst and then to oligomerize said butadiene.

6. A process for the oligomerization of butadiene which comprises contacting butadiene with a catalyst which is formed from nickel carbonyl and a compound selected from the group consisting of polyenes and acetylene compounds and keeping the concentration of carbon monoxide released from the nickel carbonyl low by using only 0.001 to 0.1% by weight of nickel carbonyl with reference to butadiene.

7. A process as claimed in claim 1 wherein said concentration of said catalyst is between 0.001% and 0.5% by weight.

References Cited by the Examiner

UNITED STATES PATENTS 2,686,208  8/1954  Reed _____ 260—666

OTHER REFERENCES

Hugh W. B. Reed; J. Chem. Soc., pp. 1931–1941, 1954.

DELBERT E. GANTZ, *Primary Examiner.*

V. O'KEEFE, *Assistant Examiner.*